A. K. SLOAN, Jr.
UNIVERSAL BINDING POST.
APPLICATION FILED FEB. 27, 1911.
1,020,457.
Patented Mar. 19, 1912.
2 SHEETS—SHEET 1.
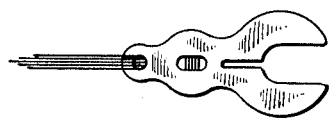
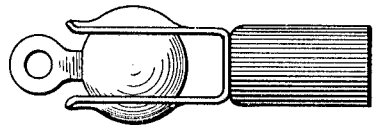
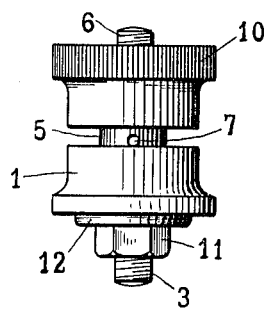
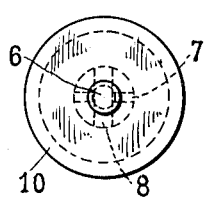
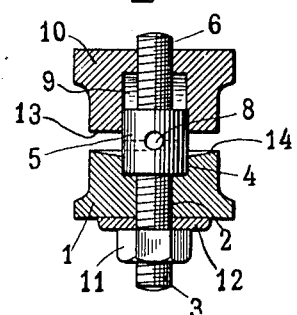
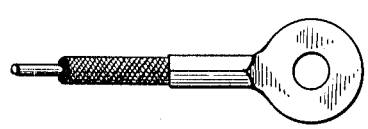
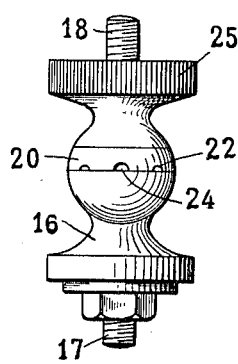
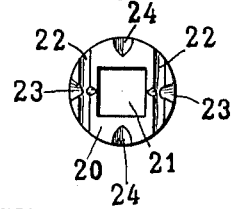
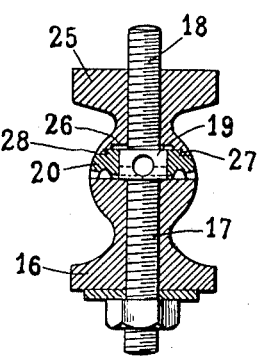
WITNESSES
INVENTOR
Augustus Kellogg Sloan, Jr.
BY
ATTORNEY A. K. SLOAN, Jr.
UNIVERSAL BINDING POST.
APPLICATION FILED FEB. 27, 1911.
1,020,457.
Patented Mar. 19, 1912.
2 SHEETS—SHEET 2.
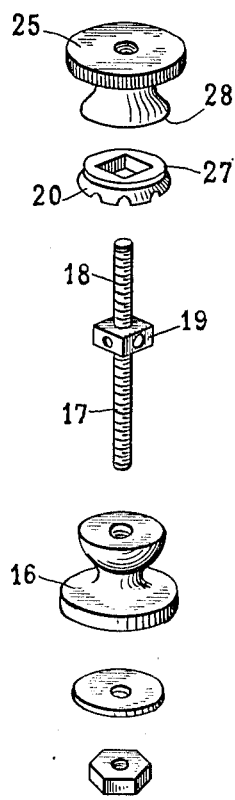
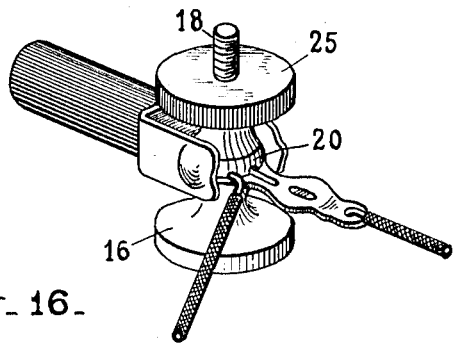
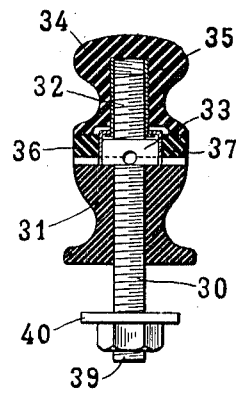
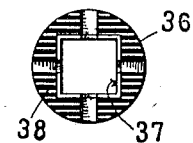
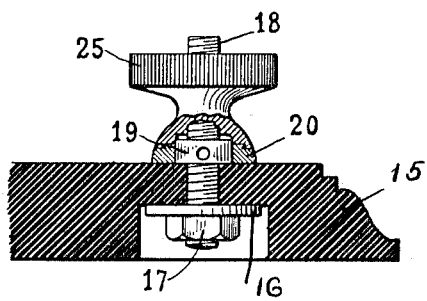
WITNESSES
INVENTOR
Augustus Kellogg Sloan, Jr.
BY
ATTORNEY

UNITED STATES PATENT OFFICE.

AUGUSTUS KELLOGG SLOAN, JR., OF BROOKLYN, NEW YORK.

UNIVERSAL BINDING-POST.

1,020,457.   Specification of Letters Patent.   Patented Mar. 19, 1912.

Application filed February 27, 1911. Serial No. 611,265.

*To all whom it may concern:*

Be it known that I, AUGUSTUS KELLOGG SLOAN, Jr., a citizen of the United States, and a resident of Brooklyn, in the county of Kings and State of New York, have invented a certain new and useful Universal Binding-Post, of which the following is a full, clear, and exact description, whereby any one skilled in the art may make and use the same.

The invention relates to binding posts used for making electrical connections and more particularly to a binding post having features of universal use in connection with well-known forms of terminal connectors.

The object of the invention is to provide a universal binding post adaptable to receive any well-known form or type of terminal connector, including plain or stranded wire, even when said wires are of various sizes.

A further object is to provide for a direct and continuous conductor in the binding post adapted in conjunction with any form of terminal connector to directly transmit current to the circuit wire to which the binding post is attached.

Referring to the drawings Figure 1 is a plan view of a form of terminal connection. Fig. 2 illustrates another form of the ball and socket type. Fig. 3 is an elevation of a binding post having some of the features of the invention. Fig. 4 is a top plan view of the device shown in Fig. 3. Fig. 5 is a central vertical section through the nut and base illustrating the continuous conductor. Fig. 6 is a plan view illustrating a form of terminal connection which may be used. Fig. 7 illustrates a terminal connection consisting of a stranded wire. Fig. 8 illustrates a terminal connection of simple solid wire. Fig. 9 illustrates the binding post to which the various forms of terminal connections may be applied. Fig. 10 is a central vertical section of the post illustrated in Fig. 9. Fig. 11 is a bottom plan view of the clamping washer. Fig. 12 illustrates the several parts of the binding post shown in Fig. 9 unassembled. Fig. 13 illustrates the parts assembled with a number of the terminal connections, such as shown in Figs. 1, 2, 7 and 8, connected in to form a circuit. Fig. 14 illustrates the main conductor mounted directly without the base-piece. Fig. 15 illustrates a type of connector wherein the conducting wire is inserted and secured within a sleeve bearing a solid terminal point. Fig. 16 illustrates the main conductor and appurtenant parts wherein the entire outer surface of the binding post is insulated. Fig. 17 illustrates the clamping washer of a binding post like that illustrated in Fig. 16.

Various forms of binding posts are common and well-known in the art wherein the terminal connection is wound about a threaded stem and clamped by a nut and wherein the stem is perforated so that the terminal connector may be passed through a perforation in the stem and clamped by a nut. In all such devices, so far as known, there has not been provided a universal type of post, wherein terminal connectors of various forms might be readily applied to the binding post and wherein several forms of connectors might be applied at the same time.

It is one of the principal objects of the present invention to provide a binding post universal in its application and universal as regards the terminal connectors to be used therewith, at the same time, providing a direct, continuous and unbroken metallic contact to the circuit wire to which the binding post is attached.

Referring to the drawings, Figs. 3 to 5, there is illustrated some of the salient features of the invention, wherein a base-piece 1 is provided with a threaded opening 2 adapted to receive a threaded shank 3 of a conducting post. As shown, the base is countersunk at 4 to receive an enlarged section 5, which has a continued threaded stem 6. As illustrated, the enlarged section 5 is transversely perforated as at 7, 8, so that it may receive wires of different sizes and the enlargement is of sufficient length to project within a countersunk recess 9, in the clamping nut 10. A nut 11 and washer 12 provide a convenient means for securing a line wire connection to the binding post. The recess 9 is of such a depth that the lower face 13 of the clamping nut 10 may come into flush engagement with the upper edge or face 14 of the base 1 against which the terminal conductor is held by the said clamping nut. With this arrangement, it is apparent that any form of wire may be wrapped about the central connector and about the enlarged portion 5 without liability of engaging the threads of the spindle. On the other hand, the terminal connector may be inserted through the openings 7 and 8 and when the clamping nut is screwed down, will be firmly bound to the continuous conductor. The conductor provides a firm engagement for the terminal connection and also a direct engagement for the line wire connection, so that there are no intermediate screw-threaded parts liable to corrosion which will destroy the perfect electrical contact between the terminal connector and the line wire, for, as will be seen, the stem of the binding post is integral throughout, thus insuring that the line wire connection therewith, secured by the clamp nut 11, and the connections therewith of the terminals that engage with the stem and are held in place by the adjustable clamp nut such as 10, shall be with the same integral piece of conducting metal, and therefore cannot be more or less separated, electrically, by ill fitting parts, or because of corrosion between more or less closely fitting parts formed of separate pieces of metal.

In Fig. 14, the continuous conductor is illustrated as mounted directly upon the base of an instrument 15 with a clamping washer 16 and clamping nut 17, which insures a firm connection of the terminal with reference to the continuous conductor 18. This figure merely illustrates the possibility of doing away with the base-piece 1, and providing a binding post which will give secure contact even without the base-piece.

Referring to Figs. 9 to 13 inclusive, there is illustrated the same feature of continuous connection in conjunction with binding post elements, which give a universal connection for any of the several forms of connectors illustrated in Figs. 1, 2, 6, 7, 8 and 15. In said figures, the base-piece 16 is screw-threaded to receive the lower end 17 of the continuous conductor which has an upper threaded portion 18, and an enlarged central portion 19 of angular form (herein shown as squared) which rests firmly against the upper surface of the base-piece 16. A clamping washer 20 surrounds the conductor and is provided with an angular opening 21, which fits loosely over the enlarged angular portion 19. The enlarged portion 19 is perforated preferably in transverse directions to receive terminal wires of different diameters. The under face of the washer 20 is grooved as at 22 outside of the enlarged central portion 19 and also has grooved openings 23, 24 registering respectively with the transverse perforations of the continuous conductor. These latter grooves are enlarged at the outer edge of the washer so that the terminal wire may be moved within reasonable latitudes without cramping against the edges of the washer or the edges of the base-piece. With this arrangement, the terminal wire passing through one of the perforations and securely clamped down will not be scarfed or bound at the outer edge of the washer to such an extent as to cause liability of breakage. A nut 25 is threaded on the stem 18 and is recessed as at 26 so that the washer 20 may be clamped firmly against the upper edge of the base-piece 16. As the enlarged portion 19 is of angular form and the perforation of the washer 20 is of similar form, there will be no relative rotation between the washer and the main conducting spindle. In order that the washer 20 will be lifted and lowered by manipulation of the clamping nut 25, its upper edge is grooved as at 27 and into said groove is spun a flange 28 of the nut 25. This permits rotation of the nut upon its thread which will raise and lower the clamping washer 20. There is a particular advantage in this, inasmuch as manipulation of the nut 25 will always control the position of the washer 20, leaving the space between the washer and the base unencumbered for the insertion of any of the several forms of terminal connectors.

It will be observed that the nut, washer and base are of such shape that when brought together they are of approximately spheroidal form so that the connector illustrated in Fig. 2, may be readily applied as shown in Fig. 13. This may be done without interfering with the use of such a connector as illustrated in Fig. 1, or any of the several forms illustrated in Figs. 6, 7, 8 and 15.

The universal features and direct conducting features of the binding-post will be readily understood from the above description of parts and while the ordinary binding post, so far as known in the art, may be used with individual forms of terminal connections, the device herein described, provides for the connection of a plurality of terminal connectors of various forms at the same time. This universal feature is obviously of great value, particularly with instruments or devices which are subject to change of terminal connectors and more particularly where various forms of terminal connectors are used with instruments which it may be desirable to connect to line wire circuits having a binding post.

Obviously, the exact form and detail of the device might be varied to a considerable extent without departing from the spirit or intent of the invention which contemplates, in the main, a binding post to which any form of terminal connector may be applied, insuring a direct transmission through a continuous conductor.

In Figs. 16 and 17, there is illustrated a form of the continuous conductor, completely inclosed by insulating material. The continuous conductor is threaded as at 30, and passes through an insulating base-piece 31. It has a threaded spindle 32 projecting from an enlargement 33, which is perforated as heretofore described. The clamping nut 34 contains a bushing 35 threaded to receive the spindle 32 and the clamping washer 36 is provided with a metallic center 37 and exterior insulating section 38 so arranged that it will fit about the enlargement 33 and thus give a secure connection between the terminal connector inserted through the perforations of the enlargement and the line wire connection secured as by a nut 39 and washer 40. This form of the device is shown merely to illustrate the adaptability of the continuous conductor to any form of binding post and illustrates the possibilities of complete insulation, at the same time, providing positive and direct electrical connections.

What I claim as my invention and desire to secure by Letters Patent is:

1. A binding post having in combination a base piece, a continuous integral conductor extending through and seated in the said base piece and provided with an enlargement that extends beyond the exposed face of the base piece, and a clamping member surrounding the enlargement and adjustable thereover arranged to clamp a terminal conductor that may engage with the enlargement against the end face of the base piece.

2. A binding post having in combination a base piece, a continuous integral conductor extending therethrough and provided with a transversely perforated enlargement extending beyond the face of the base piece, and a member surrounding the said enlargement and adjustable thereover for clamping a terminal conductor seated in the said perforation through the enlargement against the end face of the base.

3. A binding post comprising in combination with a support, a continuous conductor having an angular enlargement, a clamping washer encircling and fitting over said enlargement, and a nut connected with and controlling the position of said clamping washer.

4. A binding post comprising in combination with a base piece or support, a continuous conductor having a perforated enlargement, a clamping washer encircling said enlargement, and a nut mounted upon the said conductor connected with and arranged to move, and controlling the position of said clamping washer.

5. A binding post comprising in combination with a support, a continuous conductor having an enlargement, a non-rotatable clamping washer longitudinally movable over the said enlargement and having grooves on its clamping face, and a nut controlling the position of and arranged to move said clamping washer.

6. A binding post comprising a base, a continuous conductor extending through the base, means for clamping a connector with reference to the conductor, said base and clamping means being when brought together to clamp a connector of substantially spheroidal form.

7. A binding post comprising a base and support, a continuous conductor extending therethrough, said conductor having an enlarged portion appurtenant to the upper face of the base, clamping means adjustable upon said conductor and extending over the enlargement, openings extending through the enlargement, and tapered grooves formed on the clamping means and registering with said perforations.

8. A binding post comprising a base and support, a continuous conductor extending therethrough and provided with an angular enlargement, a clamping washer surrounding said enlargement, and a clamping nut in engagement with said washer whereby the latter will be raised and lowered during the manipulation of the nut.

9. A binding post having a plurality of apertures, and a movable clamping device coöperating with the binding post for connecting a plurality of terminal conductors, the said binding post and clamping device when brought together into clamping position having a free substantially spheroidal exterior for the attachment of a socket connector.

10. A binding post comprising, in combination with a base piece or support, a movable clamping washer, and a nut in operative engagement with the said washer for positively moving the latter either toward or away from the face of the said base accordingly as the nut is turned.

AUGUSTUS KELLOGG SLOAN, Jr.

Witnesses:
KATE BRENNER,
WM. B. HILL.